Dec. 12, 1933.  G. J. ABBOTT  1,938,570
TOOL FOR CUTTING TONGUES IN METAL SHEETS
Filed Oct. 10, 1932  3 Sheets-Sheet 1
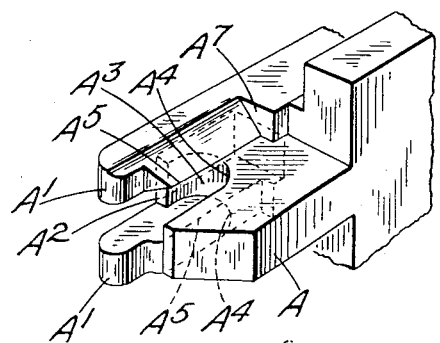
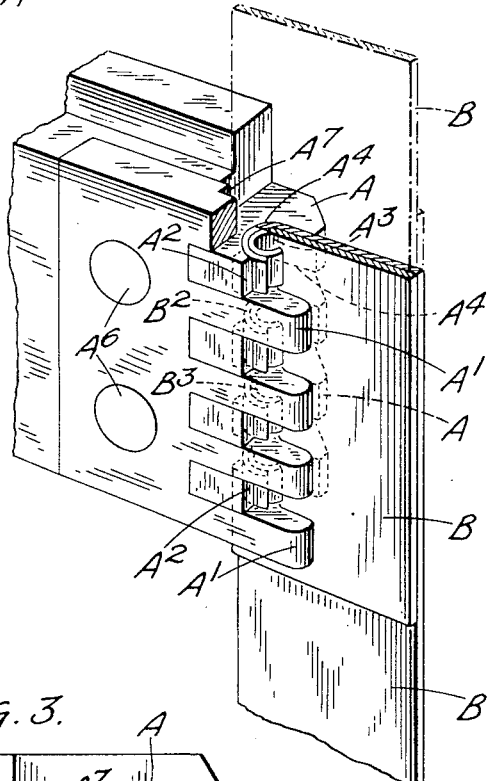
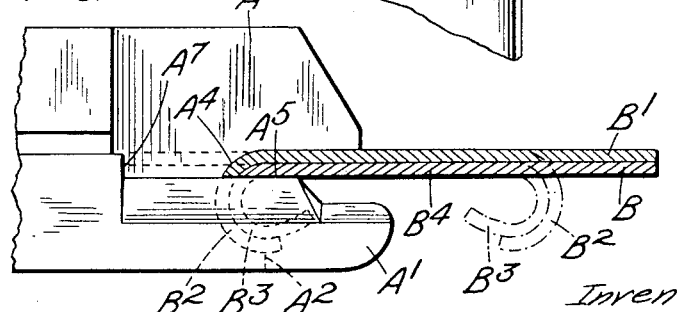
Inventor,
G. J. ABBOTT.

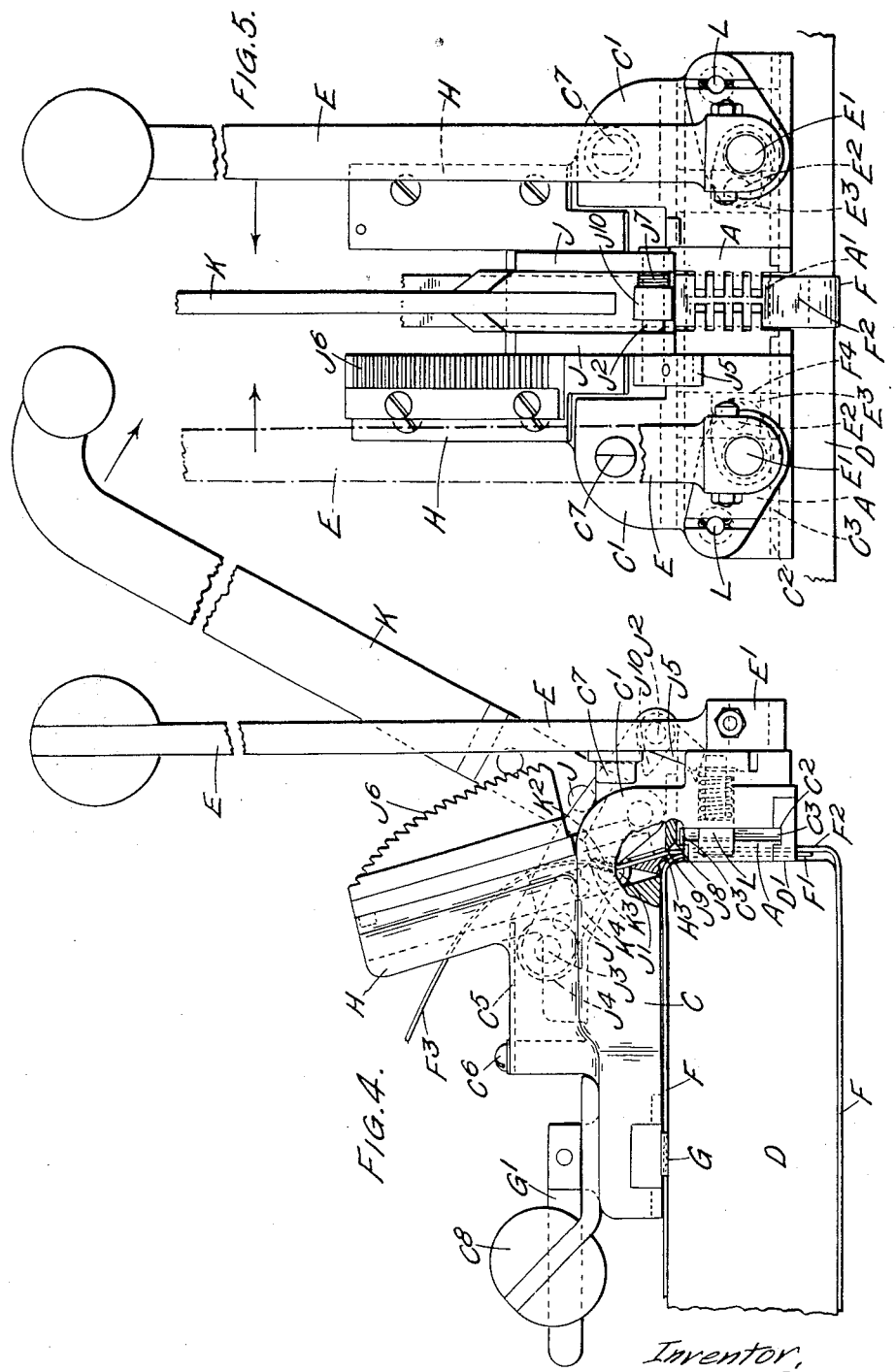

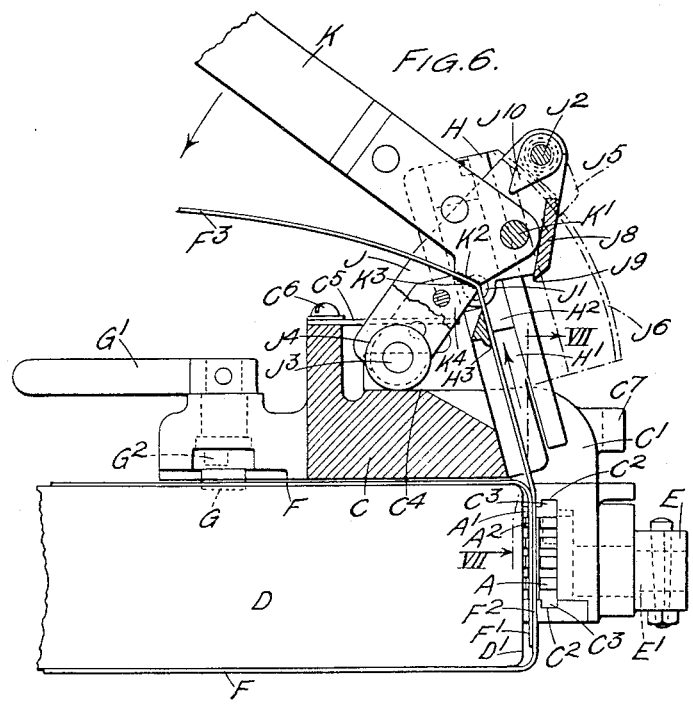

Patented Dec. 12, 1933

1,938,570

UNITED STATES PATENT OFFICE 1,938,570

TOOL FOR CUTTING TONGUES IN METAL SHEETS

Geoffrey Joseph Abbott, London, England, assignor to Packers Supply Company Limited, New Malden, Surrey, England, a registered company of Great Britain Application October 10, 1932, Serial No. 637,197, and in Great Britain November 4, 1931

4 Claims. (Cl. 81—9.1)

This invention relates to metal cutting tools more particularly designed for cutting tongues in the marginal parts of sheet metal.

The object of the invention is to provide a tool adapted to cut and strike up such tongues in a manner which will enable the tool to be employed for various purposes, but a tool embodying this cutter is more especially suitable for use in connecting together the overlapped portions of metallic strapping, such as metal girths employed for binding barrels, bales, crates and the like, the tongues being then cut in the opposite edges of the over-lapping parts of the girth and bent or curled over, thus forming a joint which will prevent separation of the overlapping parts.

A tool according to the present invention comprises three cutter members disposed side by side and together constituting a cooperating set of cutters, each cutter member having a face which in the main or intermediate cutter member is bounded on two opposite sides by cutting edges whilst each lateral cutter member has a complementary cutting edge which lies immediately adjacent to one of the cutting edges of the intermediate member and at an angle thereto so that these two pairs of cutting edges will function simultaneously as shears and cut a tongue in the edge of the sheet metal forced into the shears. The faces of the two lateral cutter members preferably lie in one plane and serve as a support for the marginal portions of the metal sheet on either side of the tongue as this is cut.

Conveniently the set of cutters is furnished with one or more stops which limit the distance to which the edge of the sheet metal can be forced into the tool and thus determine the length of the cuts made and of the tongue. The surface of the intermediate member between its cutting edges and beyond the point at which these cutting edges intersect with the cutting edges of the lateral members is preferably so shaped as to deflect or bend the tongue out of the plane of the sheet metal as the tongue is being cut. This tongue-deflecting surface of the intermediate member may be curved in such a manner that the tongue, as it is cut, will be curled over towards the surface of the main part of the sheet metal.

The invention is particularly applicable for joining over-lapped portions of metallic strapping, and to this end two sets of cutting members as above described may be disposed oppositely on jaws relatively movable towards and away from each other so that when the over-lapped portions of the girth are positioned between the cutters and the jaws are forced together, tongues will be simultaneously cut in the opposite edges of the over-lapped parts so as to lock these together. If desired two or more sets of cutter members may be thus arranged in each of the two relatively movable jaws, so as to enable a series of tongues to be cut simultaneously in each of the opposite edges of the metal strap where the two parts are over-lapped.

In another form of tool also according to the invention, and suitable for joining over-lapped portions of metallic binding girths, means are provided for gripping the girth adjacent to one of the over-lapped parts with mechanism for gripping the girth adjacent to the other over-lapped part and for applying tension to the girth about the article being bound, the body portion having a device for acting upon the two over-lapped portions simultaneously while the girth is under tension so as to cause these portions to interengage.

A tool embodying the present invention is particularly suitable for making joints of the kind described in the specification accompanying the present applicant's concurrent application for United States of America Letters Patent Serial No. 637,196, filed October 10, 1932, and three constructional forms are illustrated by way of example in the accompanying drawings, in which Figure 1 illustrates in perspective a simple form of cutter whereby a single tongue can be cut in the overlapping portions of metallic strapping, Figure 2 shows, in a similar manner, a cutting element comprising a series of cutters as shown in Figure 1, Figure 3 shows in plan the cutter illustrated in Figure 2.

Figure 4 is a side elevation with part cut away of a tool for use in connecting together the over-lapped portions of metallic binding girths.

Figure 5 is an end elevation looking from right to left of the construction shown in Figure 4, Figure 6 is a side elevation, partly in section, showing the position occupied during tensioning, Figure 7 is a section on the line VII—VII of Figure 6, and Figure 8 is a section on the line VIII—VIII of Figure 7.

The simple form of cutter illustrated in Figure 1 comprises three cutter members disposed side by side and including a main cutter member A and two lateral cutter members A¹, the main cutter member lying intermediate between the lateral cutter members A¹. The intermediate member A has a part A² which extends between the two lateral members $A^1$ and is furnished with a curved face $A^3$ bounded on two opposite sides by cutting edges $A^4$. Each lateral member $A^1$ has a cooperating cutting edge $A^5$ which intersects the adjacent edge $A^4$ of the intermediate member A at an angle so that the two pairs of cutting edges $A^4$, $A^5$ will function simultaneously as shears and cut a tongue in the edge of the over-lapped portions of the metal strip forced between the shears, in the manner hereinafter fully described.

In the construction illustrated in Figures 2 and 3 the cutter element comprises a series of sets of cutter members as shown in Figure 1, the individual members A together forming one complete unit secured by studs $A^6$ to a similar unit formed of the members $A^1$. When two overlapped portions B, $B^1$ of metallic strapping are forced into the tool as shown in Figure 2, the curved faces $A^3$ of the intermediate members A force the two layers of metal out of the plane of the strips B, $B^1$ so that the cutting edges $A^4$, $A^5$ on each side of each of the curved faces $A^3$ act as shears to cut the two layers of metal and thereby form tongues each of which comprises two layers $B^2$, $B^3$ of metal. As the edge of the strip passes into the tool each curved face $A^3$ acts so as simultaneously to curl the two layers $B^2$, $B^3$ towards the face $B^4$ of the strip, as clearly shown in Figure 3. Each of the members $A^1$ is furnished with a shoulder or stop $A^7$ against which the edge of the metal strip abuts as shown, thereby determining the length of each tongue.

The cutter, after forming the tongues in one margin of the metal strip as illustrated in Figure 2, may then be applied in a similar manner to the opposite margin where the two parts overlap, thus firmly securing together the over-lapping portions B, $B^1$ as indicated in Figure 3. It will be understood that to form the tongues the cutter as illustrated in Figure 1 or in Figures 2 and 3 may be either rigidly held while the metallic strip is moved or, alternatively, the strip may be rigidly held whilst the tool is applied to its edge.

The three cutter members, that is to say the intermediate and each of the two lateral members comprising a set, may be formed separately and, when assembled side by side in their correct relationship, connected together as by bolts. Such a separate formation of the cutter members is convenient as facilitating the making of the cutters and giving and maintaining the necessary cutting edges. Further, instead of the fixed stops as above described for determining the length of each tongue cut, adjustable stops may be provided for this purpose.

If desired two sets of cutters, for example as illustrated in Figure 7, may be disposed oppositely and movable towards and away from each other, so that when the metallic strip is inserted between them and the cutters forced towards each other a series of tongues will be cut simultaneously in the opposite edges of the strip.

One such construction adapted to join overlapped portions of metallic binding girths is illustrated in Figures 4 to 8 of the accompanying drawings, this tool being adapted to form a joint which lies upon the side or edge of the box, bale or crate being bound. In this construction the tool comprises a body portion C adapted to lie on the upper surface of the box, indicated at D, and two downwardly directed parts $C^1$, spaced apart and adapted to overhang the side face $D^1$ of the box while the tool is in use, as indicated in Figure 6. Each of the parts $C^1$ is furnished with two parallel guide channels $C^2$ within which can slide flanges $C^3$ formed on a jaw or cutter element having cutters $A^1$, $A^2$ as illustrated in Figures 2 and 3. The two jaws or cutter elements can thus be moved towards or from each other within the guide $C^2$ as clearly shown in Figure 7.

Movement of each cutter element is effected by means of an operating lever E keyed to a stub axle $E^1$ (Figure 8) which is journalled in the corresponding part $C^1$ of the body portion C. The stub axle $E^1$ carries a crank $E^2$ upon which a rectangular sliding block $E^3$ can rotate, the block $E^3$ engaging a transverse slot $E^4$ in the corresponding cutter element. Thus, by moving the two levers E in the upward direction from the position shown in Figure 7, the cutter elements will be moved towards each other until they arrive at the position shown in Figure 5, the blocks $E^3$ sliding in the slots $E^4$. Similarly when the levers E are moved downwards from the position indicated in Figure 5 back to that shown in Figure 7, the two cutter elements will be moved away from each other.

When the cutter elements are in the position shown in Figure 7, the cutter members $A^1$ are so spaced apart that when the free end $F^1$ of a length of metallic strapping with which the box D is to be bound is placed between the cutters the marginal portions of the strapping will lie upon the outer ends of the cutter members $A^1$. The strapping F is then passed over the upper surface of the box D where it is firmly gripped by a clamp on the body of the tool and comprising a jaw G movable by means of a handle $G^1$ through a crank $G^2$ transversely to the length of the strapping, the jaw G gripping the strapping F against a fixed jaw (not shown) carried by the body portion C. The strapping F, after being passed around the box D, is again brought between the cutters so that a portion $F^2$ of the strapping overlaps the end $F^1$.

The strapping or girth F at this stage passes loosely around the box D and it is therefore necessary, prior to joinings the overlapping portions $F^1$, $F^2$, to apply the necessary tension to the girth F so as to bind the box D. To this end the body portion C is furnished with two upwardly inclined frame members H spaced apart as shown in Figure 5, each frame member H having a longitudinal guide slot $H^1$ (Figure 6) adapted to receive one end of a crosspiece $H^2$. The crosspiece $H^2$ thus extends between the frame members H and is freely slidable within the guide slots $H^1$. Pivoted at $J^1$ on the crosspiece $H^2$ is a rocking frame comprising two side members J connected together at one end by a rod $J^2$ and at the opposite end by a spindle $J^3$. Mounted to rotate on the spindle $J^3$ adjacent to the two ends thereof are two rollers $J^4$ which bear upon a surface $C^4$ formed on the body portion C. The rollers $J^4$ are retained in position by means of spring plates $C^5$ detachably connected by screws $C^6$ to the body portion C. Pivoted at $K^1$ between the side members J of the rocking frame is a tensioning lever K furnished with a serrated face $K^2$ adapted to cooperate, in a manner hereinafter described, with a similar face $K^3$ formed on a block $K^4$ rigidly carried between the frame members J of the rocking frame. The spindle $J^2$ carries at one end a pawl $J^5$ arranged to cooperate with a rack $J^6$ carried by one of the side frame members H, and a coiled spring $J^7$ is mounted on this spindle $J^2$ (see Figure 5) and tends to turn the pawl $J^5$ into a position in which it will engage the rack $J^6$. A plate $J^8$ rigidly secured to the rocking frame members J is furnished with a cutting edge J⁹ adapted to cooperate as hereinafter described with a cutting edge H³ carried by the crosspiece H².

When therefore the two parts F¹, F² of the girth F have been overlapped as above described and as shown in Figure 6, the tensioning lever K is first moved towards the position substantially as shown in Figure 4 but with the serrated faces K², K³ spaced apart. The end F³ of the girth F can thereupon be threaded from below through the rocking frame J so as to lie between the surfaces K², K³. If now the tensioning lever K is moved in the counter-clockwise direction as indicated by the arrow in Figure 6, the end F³ of the girth will be gripped between the surfaces K², K³, and the rocking frame J together with the crosspiece H² will move upwards relatively to the fixed frame members H, the rollers J⁴ bearing on the surface C⁴ and thereby acting as a fulcrum for the rocking frame J. In this way tension will be applied at the end F³ of the girth, the pawl J⁵ riding over the rack J⁶ until the desired tension has been applied, whereupon the pawl will engage the rack and prevent reverse movement of the tensioning mechanism.

The girth F is in this way tightly drawn about the box D and the over-lapping parts F¹, F² may now be secured together. To this end the levers E are moved upwards from the position shown in Figure 7 so that the cutter elements on opposite sides of the over-lapping portions of the girth are moved towards each other so as to cut a series of tongues in the over-lapping parts as above described, the tongues being curled inwards towards the side face D¹ of the box D. Upward movement of the levers E and inward movement of the cutters is limited by stops C⁷ carried by the parts C¹. The over-lapping parts of the girth are in this way firmly secured together and the surplus portion F³ of the strapping can now be cut off.

The cutting-off operation is illustrated in Figure 4 and is effected by turning the tensioning lever K from the tensioning position shown in Figure 6 towards the position shown in Figure 4 so that the lever K first engages a latch J¹⁰ operatively connected to the pawl J⁵, thus lifting the pawl clear of the rack J⁶. Continued movement of the tensioning lever K in the direction indicated by the arrow in Figure 4 results in the rocking frame J and also the crosspiece H² moving downwards relatively to the fixed frame members H, the gripping surface K² being at the same time moved away from the cooperating surface K³ so that the free end portion F³ of the strapping is allowed to pass between these gripping surfaces as the rocking frame moves downwards. As the tensioning lever K approaches the position illustrated in Figure 4, the strapping is engaged between the cutting edges H³ and J⁹ so that the surplus end of the strapping F³ is cut off close to the joint in the girth. For the purpose of steadying the tool in position, particularly during the cutting operation, a rigid handle C⁸ is provided at one end of the body portion C.

The levers E can now be moved downwards so that the cutter elements are moved away from each other into the position shown in Figure 7. At this stage that part of the girth at the joint still rests upon the ends of the cutters A¹, and it is therefore necessary to retract these cutters still further in order to permit removal of the tool. Each cutter element is therefore furnished with a chamfered surface L¹ which cooperates with a similar surface formed on a stud L capable of reciprocating within the corresponding member C¹ against the action of a spring L². In this way, when the levers E are in the position shown in Figure 7 and it is desired to remove the tool after the joint has been made, the levers E are forced downwards so that the chamfered surface L¹ of each of the cutter elements rides over the corresponding surface on the cooperating stud L which is in this way moved inwards against the action of the spring L², a stop L³ on the stud L limiting the outward movement of the cutter element. The cutter members A¹ are now sufficiently spaced apart to permit the over-lapped portions F¹, F² of the girth to pass between them and the tool can be removed. By moving the levers E upwards into the position shown in Figure 5, the tool will be ready for effecting the next joint.

It will be understood that while the tool has been above described as applied to a girth having two free ends F¹, F³, the tool is particularly suitable for binding boxes or the like by means of metallic strapping supplied in roll form. When employed in this manner the free end of the roll is first passed from above between the gripping jaws K², K³ and thence between the cutter elements, round the box or bale and again between the cutter elements as shown in Figure 6, whereupon the strapping is clamped by means of the clamp G with the end F¹ of the strapping overlapped as shown in Figure 6. Thus, after each joint has been made and the strapping cut above the joint as described, the free end of the strapping will project through the rocking frame J and can be drawn downwards and bound round the bale. This method results in a minimum wastage of metallic strapping material and also reduces the threading operations.

It will be seen that with a tool as above described, the overlapped portions of the strapping, while engaged in the tool, are just clear of the surface of the article being bound. When therefore the joint is complete and the tool is removed, substantially the full tension is maintained in the girth since the bent and curled-over tongues bear against the surface of the article bound and so take up any slack in the girth.

Further, the tool enables a joint to be made between over-lapping portions of a metallic girth so that the joint lies on the narrow edge or side face of the box or package being bound, and thereby overcomes the disadvantage frequently encountered in binding relatively shallow packages, namely that when the joint in the girth is made on the upper or lower flat surface, the contents of the box are liable to be damaged due to one box being placed upon the other and the additional thickness of the joint in the girth causing indentation not only of the adjacent surface of the box but also its contents. Further, when the joint is made on one of the major surfaces of the package, the joint is liable to cause obstruction or even damage due to several packages being stacked and moved one over the other. It will, however, be understood that a tool embodying the invention may also be applied for joining the over-lapped portions of metallic girths on one of the major surfaces of the box or package to be bound.

When two cutter elements according to the invention are employed simultaneously to cut tongues in the opposite edges of metallic strapping, the cutters may be disposed either directly opposite each other as in the constructions above described, or in staggered relation, according to whether it is desired that the tongues cut in the opposite edges of the strapping shall lie in pairs opposite to each other or in staggered relation.

It will be seen that a combined tool in accordance with the present invention combines in one single compact device all the advantages hitherto obtained only by separate means for effecting the various steps of joining the two ends of a metallic girth, namely anchoring, tensioning, securing the over-lapping parts together, and severing the girth from the supply roll or from surplus strip. It will further be understood that the constructions above described are given by way of example only and may be modified without departing from the invention. Thus, in the combined tool the jaws may be constructed and operated to effect some other form of joint between the two over-lapping parts of the girth.

What I claim as my invention and desire to secure by Letters Patent is:—

1. A tool for joining overlapped portions of sheet metal including in combination a main cutter member, two lateral cutter members disposed one on each side of and in fixed relation to the main cutter member, a cutting edge on each of the lateral cutting members, a face on the main cutter member, said face being bounded on opposite sides by cutting edges and comprising a straight portion and a deflected portion, said straight portion leading inwards towards the lateral cutting edges with the cutting edges on the main cutter member intersecting the lateral cutting edges at an angle whilst the deflected portion turns outwards towards the direction in which the cut is to be made and lies beyond the cutting plane, the two pairs of cutting edges formed by the main and lateral cutting members acting simultaneously as shears when the superimposed edges of sheet metal are forced into the angles at the points of intersection of the cutting edges thereby cutting superimposed tongues simultaneously in the said overlapped portions, the tongues as they are cut being engaged by the deflected portion of the main cutter member which thus curls the superimposed tongues inwards towards the centre of the sheet metal.

2. A tool for joining overlapped portions of sheet metal including in combination a main cutter member, two lateral cutter members disposed one on each side of and in fixed relation to the main cutter member, a cutting edge on each of the lateral cutter members, a face on the main cutter member, said face being bounded on opposite sides by cutting edges and comprising a straight portion and a curved portion, said straight portion leading inwards towards the lateral cutting edges with the cutting edges on the main cutter member intersecting the lateral cutting edges at an angle, while the curved portion turns outwards towards the direction in which the cut is made and lies beyond the cutting plane, the two pairs of cutting edges formed by the main and lateral cutting members acting simultaneously as shears when the superimposed edges of sheet metal are forced into the angles at the points of intersection of the cutting edges, thereby cutting superimposed tongues simultaneously in the said overlapped portions, the tongues as they are cut being engaged by the curved portion of the main cutter member which thus curls the superimposed tongues inwards towards the centre of the sheet metal.

3. A tool for joining overlapped portions of metallic strapping including in combination two oppositely disposed jaws relatively movable towards and away from each other, two cutter elements one carried by each jaw and comprising a main cutter member, two lateral cutter members disposed one on each side of and in fixed relation to the main cutter member, a cutting edge on each of the lateral cutter members, a face on the main cutter member said face being bounded on opposite sides by cutting edges and comprising a straight portion and a deflected portion, said straight portion leading inwards towards the lateral cutting edges with the cutting edges on the main cutter member intersecting the lateral cutting edges at an angle, whilst the deflected portion turns outwards towards the direction in which the cut is to be made and lies beyond the cutting plane, the two pairs of cutting edges formed by the main and lateral cutter members acting simultaneously as shears when the overlapped portions of strapping are placed between the cutter elements and the jaws are moved towards each other solely in a direction parallel to the plane of the strapping, thereby cutting superimposed tongues simultaneously in the opposite longitudinal edges of the said overlapped portions, the tongues as they are cut being engaged by the deflected portion of the face of each main cutter member which thus curls the superimposed tongues inwards towards the centre of the strapping.

4. A tool for joining overlapped portions of metallic strapping including in combination two oppositely disposed jaws relatively movable towards and away from each other, two cutter elements one carried by each jaw and comprising a main cutter member, two lateral cutter members disposed one on each side of and in fixed relation to the main cutter member, a cutting edge on each of the lateral cutter members, a face on the main cutter member, said face being bounded on opposite sides by cutting edges and comprising a straight portion and a curved portion, said straight portion leading inwards towards the lateral cutting edges with the cutting edges on the main cutter intersecting the lateral cutting edges at an angle, whilst the curved portion turns outwards towards the direction in which the cut is to be made and lies beyond the cutting plane, the two pairs of cutting edges formed by the main and lateral cutter members acting simultaneously as shears when the overlapped portions of strapping are placed between the cutter elements and these are moved towards each other solely in a direction parallel to the plane of the strapping thereby cutting superimposed tongues simultaneously in the opposite longitudinal edges of the said overlapped portions, the tongues as they are cut being engaged by the inner surface of the curved portion of each main cutter member which thus curls the superimposed tongues inwards towards the centre of the strapping.

GEOFFREY JOSEPH ABBOTT.